United States Patent Office 3,188,983
Patented June 15, 1965

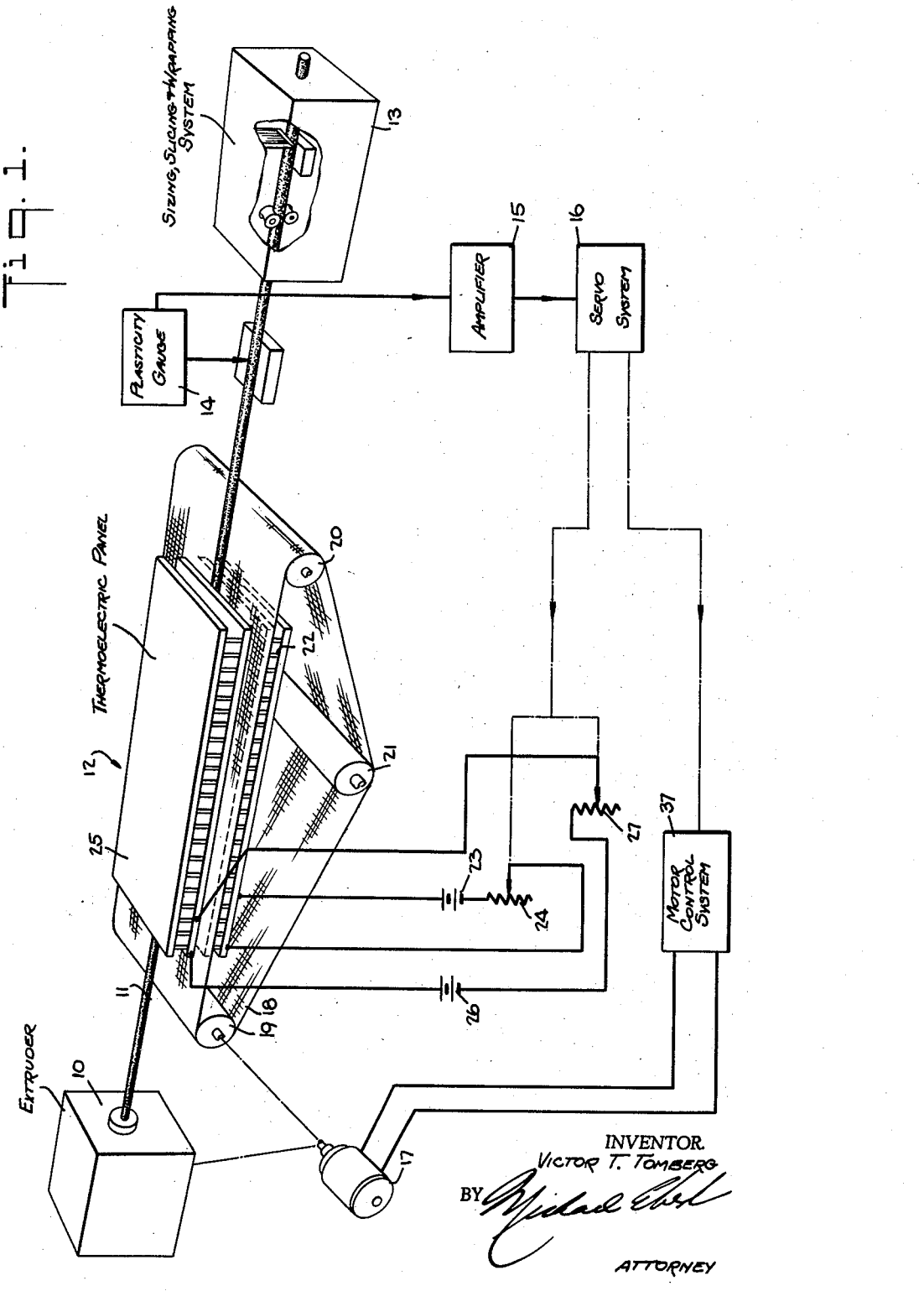

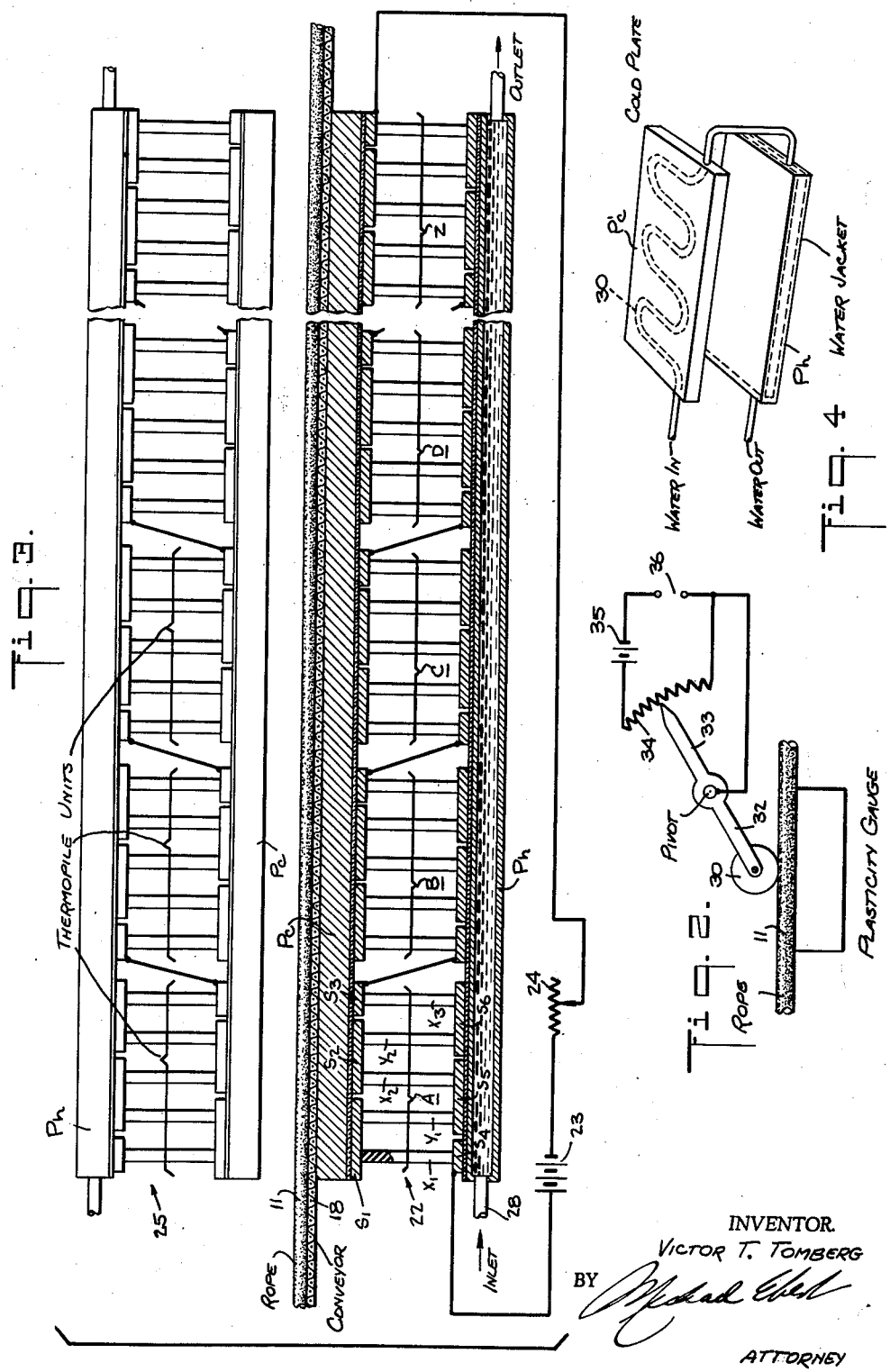

3,188,983
APPARATUS FOR CONTINUOUSLY CONVEYING AND COOLING EXTRUDED SUBSTANCES
Victor T. Tomberg, Elmhurst, N.Y., assignor to Topps Chewing Gum Co., Inc., New York, N.Y., a corporation of New York
Filed Jan. 9, 1963, Ser. No. 250,371
14 Claims. (Cl. 107—14)

This application is a continuation-in-part of my co-pending application entitled "Extruded Rope Feeder," Serial No. 162,945, filed December 28, 1961, now abandoned.

This invention relates generally to apparatus for conveying and simultaneously cooling softened thermoplastic substances, and more particularly to a machine adapted continuously to feed a rope of heated chewing gum for processing in a size-forming, cutting and gum wrapping system while at the same time cooling the rope to impart sufficient hardness thereto to facilitate such processing.

In the manufacture of wrapped articles of a thermoplastic nature, such as chocolates, chewing gum and other confections, as well as pharmaceutical and food tablets, bars and sticks of various types, the ingredients in bulk form are heated in an extruder and ejected therefrom as a ribbon, web or rope. The heated rope is relatively soft, and before being fed into a size-forming mill and then into a cutting and wrapping device, it must first be cooled and congealed to a hardness or a density and compactness facilitating such processing.

For purposes of simplicity, the invention will hereafter be disclosed in connection with the manufacture of chewing gum, but it is to be understood that the novel features thereof are fully applicable to other forms of softened thermoplastic material which require simultaneous conveyance and cooling. The invention is also applicable to the controlled cooling and conveyance of any product.

Chewing gum is currently manufactured in a batch process by heating a base constituted by such ingredients as gum stock, starch, sugar, gelatin and flavors, in an extruder and deriving therefrom a hot thermoplastic rope. The rope leaving the extruder is at a temperature range of about 110° to 150° F. or higher, and cannot be further processed until its temperature is reduced to about 90° F. It is therefore the practice to cool the rope until it attains the necessary hardness before feeding it into the sizing rolls and then slicing the resultant band into separate sticks for wrapping.

The conventional batch process for making chewing gum is discontinuous and relatively slow in that the operation is interrupted to permit cooling. This time-consuming technique can be rendered continuous and faster by feeding the heated rope on an endless conveyor directly from the extruder into the rolling, cutting and wrapping system, and simultaneously cooling the rope as it is being conveyed. When a high-speed operation is desired, the time for the thermoplastic material to pass from the extruder to the rolling, slicing and wrapping system, is in the order of seconds, and the reduction in temperature of the rope must be effected within this time period.

This rapid reduction in temperature cannot be carried out effectively with conventional refrigeration devices, for they are not able to concentrate cooling power efficiently within a dimensionally small but longitudinally extended area. It must be borne in mind that the cross-sectional area of the rope is quite small, whereas the rope is elongated. It therefore becomes necessary with conventional refrigeration means to run the softened rope in serpentine fashion within a cooling chamber and thereby effectively lengthen the exposure time thereof to cooling power. There are, however, certain practical difficulties involved in this operation, for the soft rope, in order to travel this circuitous path, must be repeatedly bent, and this leads to undesirable changes in the cross-sectional dimensions of the rope, as well as to ruptures therein.

Another approach to the problem of refrigeration is by the use of long cooling tunnels, but this too is disadvantageous, for it increases substantially the space occupied by the machine. In any event, whether the extended tunnel or serpentine cooling methods are used, the problem of control arises, in that for any given speed of conveyance and regardless of the initial temperature of the rope, it is essential that the hardness of the rope as it leaves the conveyor and cooling system have a predetermined value.

This relative hardness cannot be realized by standard thermostatic control devices in refrigeration systems, for such controls take into account only the ambient temperature in the cooling chamber, and are not sensitive to other factors which influence the ultimate plasticity of the rope. In practice, it is important that the rope be neither too soft nor too hard, otherwise the subsequent processing cannot be performed efficiently.

Accordingly, it is the principal object of this invention to provide apparatus for continuously conveying a heated rope of thermoplastic material and for efficiently cooling said rope as it is being conveyed.

More specifically, it is an object of the invention to provide apparatus for continuously conveying a heated rope of gum directly from an extruder to a sizing, slicing and gum-wrapping system, which apparatus incorporates a thermoelectric cooling device effecting a concentrated and regulated cooling of the conveyed gum.

A significant feature of the invention resides in the use of a plasticity gauge for sensing the relative hardness of the rope before it enters the sizing, slicing and wrapping system, the gauge providing an analog signal to a servo mechanism which so regulates the cooling power as well as the rate of extrusion and conveyance as to maintain the desired degree of plasticity.

A further object of the invention is to provide thermoelectric panels which effect cooling uniformly over an elongated plane, whereby a rope passing linearly and continuously between two such panels may be rapidly cooled without the need for a serpentine cooling path or a cooling tunnel.

Still another object of the invention is to provide a combined conveyor and cooling apparatus wherein the passage of the softened gum rope between cooling panels on an endless conveyor belt in no way interferes with the efficiency of the cooling system.

Briefly stated, these objects are accomplished by feeding the heated rope from the extruder onto an endless conveyor belt having relatively high thermal conductivity, the belt riding over the cold surface of a thermoelectric panel which subjects the rope thereon to cooling, a second thermoelectric panel being disposed over the rope on the conveyor to produce a concentrated cooling action. The plasticity of the rope leaving the conveyor is gauged to produce a control signal in accordance with the relative hardness of the rope, the signal acting to control the operation of the cooling plates as well as the rate of extrusion and conveyance in a manner serving automatically to maintain a desired degree of hardness regardless of variations in the initial temperature of the rope, the speed of the conveyor or other factors tending to change the output hardness.

For a better understanding of the invention, as well as other objects and further features thereof, reference is made to the following detailed description to be read in conjunction with the accompanying drawing, wherein:

FIG. 1 is a schematic representation of a machine for manufacturing wrapped chewing gum, which machine includes a combined conveying and cooling apparatus in accordance with the invention;

FIG. 2 separately shows a plasticity gauge in accordance with the invention;

FIG. 3 is a sectional view of one thermoelectric panel in accordance with the invention; and FIG. 4 shows, in perspective, a modified form of thermoelectric panel.

Referring now to FIG. 1, there is shown a system for manufacturing chewing gum, the system comprising an extruder 10 which continuously produces a rope 11 of heated and softened gum. The rope is conveyed and simultaneously cooled by an apparatus, generally designated by numeral 12, to sizing, slicing and wrapping devices, represented by block 13.

The rope emerging from the combined conveyor and cooling apparatus is tested for plasticity by a plasticity gauge 14 whose output signal representative thereof is fed through an amplifier 15 to a servo system 16 which is adapted to vary the cooling power of the system and also to control the rate of extrusion and conveyance in a manner serving to maintain a desired degree of hardness or density in the rope entering the sizing, slicing and wrapping devices 13.

The extruder 10 may be any standard mechanism adapted to heat the batch of gum ingredients and to ram the resultant soft thermoplastic mix through an output orifice or die, thereby forming the rope 11. For this purpose, the extruder may include a motor-operated, screw-type compressor or similar means to force the mix through the orifice at a desired rate, the extruder being operated through suitable gear reduction means from a main electric motor 17.

The combined conveying and cooling apparatus 12 includes an endless belt 18, preferably formed of a flexible metallic mesh-like web having high thermal conductivity, such as a mesh woven of brass, copper or aluminum wire, or other elemental or alloyed metals. The belt is supported for movement between a drive pulley 19 and two idler pulleys 20 and 21.

Pulley 19 is driven from the main motor 17, the belt travelling in the horizontal plane between pulleys 19 and 20, to carry the rope 11 directly from the extruder to the subsequent processing stations where the rope is milled by suitable rolls to the desired band size, and then sliced by a reciprocating knife into individual sticks before being wrapped and packaged. The sizing, slicing and wrapping devices form no part of the present invention, and any commercially available means may be used for this purpose.

Interposed between pulleys 19 and 20 is a thermoelectric cooling panel, generally designated by numeral 22, whose structure will later be described in greater detail. The cooling panel 22 is energized from a suitable direct-voltage source 23 through a control rheostat 24, whereby the cooling power thereof may be adjusted. Belt 18 rides over the cooling panel 22 in sliding contact therewith, and as the belt is highly conductive thermally, it acts as a thermal bridge between the panel and the rope 11.

Mounted above the rope and slightly spaced therefrom is a second cooling panel 25, identical with the first panel and in vertical registration therewith. The second panel is energized from a D.-C. supply 26 controlled by a rheostat 27. Thus the soft rope is conveyed in a path extending between the two cooling panels, and heat is absorbed from the rope in the course of its conveyance.

Referring now to FIG. 3, the two cooling panels 22 and 25 are shown in greater detail, and since they are identical, the description will be limited to panel 22. Each panel is a thermoelectric device whose operation is based on the Peltier effect. In a thermoelectric device two dissimiliar thermoelectric materials having different thermoelectric powers are joined together to form a thermocouple.

According to the Peltier effect, the junction between the dissimilar thermoelectric bodies forming the thermocouple becomes cold when direct current is passed through in one direction, and becomes hot when the direction of current flow is reversed. When a plurality of such bodies is arranged in an array in which hot and cold junctions are segregated, a thermopile is provided in which heat is absorbed by the cold junctions and liberated at the hot junctions. In the arrangement shown in FIG. 3, the hot junctions are disposed on one side of the thermopile, and cool junctions on the opposite side.

The panel structure comprises a bank of identical thermopiles A, B, C, D, etc., sandwiched between a cold plate $P_c$ and a hot plate $P_h$. Plate $P_c$ is a solid rectangular plate of high thermal conductivity such as aluminum or steel; whereas hot plate $P_h$ is hollow to define a water jacket through which a cooling fluid may be circulated in heat-exchange relationship with the thermopiles.

Each thermopile is constituted by an assembly of five rods of dissimilar thermoelectric materials in alternate arrangement, the three rods $X_1$, $X_2$, $X_3$, being, for example, formed of antimony or alloys thereof, and the two rods $Y_1$ and $Y_2$ being formed of bismuth or alloys thereof. Separate strips $S_1$, $S_2$, $S_3$ of thermally and electrically conductive material, such as copper, are arranged at the upper ends of the rods, strips $S_1$ interconnecting rods $X_1$ and $Y_1$, strips $S_2$ interconnecting rods $Y_1$ and $Y_2$, and strip $S_3$ acting as a terminal for rods $X_3$.

At the lower ends of the rods, strips $S_4$, $S_5$, $S_6$ are provided, strip $S_4$ serving as a terminal for rod $X_1$, strip $S_5$ acting to interconnect rods $Y_1$ and $Y_2$, and strip $S_6$ interconnecting rods $Y_2$ and $X_3$. Thus the strips electrically join pairs of disimiliar thermoelectric rods, whereby the five rods are connected in series by the linking strips.

The bank of thermopiles A, B, C, etc. is connected in series to the direct-voltage source 23, the series connections being effected through the terminal strips $S_3$ and $S_4$ in each thermopile unit. The direction of current flow through the interconnected rods is such that the upper linking strips $S_1$ and $S_2$ form the cold junctions, whereas the lower linking strips $S_5$ and $S_6$ form the hot junctions.

To prevent short-circuiting of the upper-level strips of the several thermopiles, a thin mica sheet $M_1$ is interposed between the cold plate $P_c$ and the strips; and to the same end a mica sheet $M_2$ is interposed between the lower-level strips and hot plate $P_h$. To carry away heat from the hot strips, water is circulated in the water jacket formed by hot plate $P_h$ through inlet and outlet pipes 28 and 29.

As shown in FIG. 4, the water may be pre-cooled by an arrangement in which the cold plate $P'_c$ is constructed so as to incorporate a serpentine duct 30 through which the water is conducted before being fed into the water jacket $P_h$. Alternatively, the system may be air-cooled and air-circulated through the upper and lower plates, rather than liquid.

By cooling the thermoelectric rods in the panel structure, greater efficiency and lower temperatures in the cold strips are obtained. It is to be understood that while the various thermopiles are shown in serial connection, parallel or series-parallel connection may be used, depending on the voltage rating of the individual thermopiles and the voltage of the D.-C. source.

The cold plate $P_c$ is common to all of the cold junctions in the bank of thermopiles. Being of high thermal conductivity, the cold plate assumes a uniform low temperature throughout its entire surface area. The conveyor belt, which is also of high thermal conductivity, slides over the cold plate $P_c$, forming a thermal bridge with respect to the heated gum rope conveyed thereby, thus causing heat to be absorbed quickly and efficiently from that elongated portion of the rope in thermal communication with the panel to provide a highly concentrated cooling effect.

The second panel 25 raised above the first panel 22 is reversed in position so that its cold plate $P_c$ is at the lower level, while its hot plate $P_h$ is at the upper level. The operation of the second panel is identical to that of the first panel, the direct current therefor being derived from source 27. Thus heat is absorbed simultaneously from the upper and lower surfaces of the rope as it is conveyed by the belt and the softened gum is congealed throughout its body by the time it leaves the conveyor.

It may under some circumstances be necessary to thaw the cooled gum, and this can be accomplished simply by reversing current in the panels, whereby the cold junctions in the thermopiles then become hot junctions.

Before the cooled gum enters the sizing, slicing and wrapping system 13, it is important that its density or state of hardness be at the optimum value for such processing. As pointed out previously, excessive softness and hardness are both objectionable, for in either case the sizing and slicing operations cannot be efficiently carried out. To ensure that the gum is in the desired state, the condition of gum plasticity is tested by the gauge 14, which, as shown separately in FIG. 2, may be constituted by a weighted roller 30 which rides on the upper surface of the moving gum, the lower surface of the gum sliding over a platen 31.

Roller 30 is mounted on a pivoted arm 32 having a conductive extension 33 which acts as the sliding contact of a potentiometer 34 connected to a battery 35, such that the voltage established at terminals 36 depends on the angular position of the extension 33. This angular position is varied, depending on the extent to which roller 30 sinks into rope 11, which in turn depends on the relative plasticity of the gum. It will be appreciated that the same effect can be obtained by a strain gauge, a permeability probe, and other means, wherein a displacement which varies as a function of plasticity can be translated into a corresponding electrical value. Thus an output signal is generated in the plasticity gauge which reflects the degree of gum hardness.

The control signal from the gauge 14 is amplified in amplifier 15 before being applied to a servo mechanism of standard design which compares the signal with a reference value to produce a positional change depending on the difference therebetween. The reference value is determined by the preferred degree of plasticity, and this may be adjusted as desired. The servo mechanism acts to adjust rheostats 24 and 27 in a direction and to an extent increasing or decreasing the cooling power until a null is restored between the control signal and the reference value, and no further positional change occurs.

At the same time, the servo mechanism acts to adjust the control system 37 for the main motor 17 to increase or decrease the motor speed, thereby varying the operation of the conveyor and extruder accordingly. Since the ultimate plasticity of the gum as it leaves the conveyor and cooling apparatus depends on its initial temperature, the cooling power of the panels, and the rate at which the gum is conveyed along the panels, by simultaneously adjusting all of the elements in the system which influence ultimate plasticity, the desired plasticity may be maintained within narrow limits while the apparatus is operated at relatively high speed. It will be appreciated that the electromechanical servo mechanism disclosed herein may be replaced by a fully electronic control system wherein the control signal acts to modulate the amplitude of current fed into the cooling panel and to the main motor.

Safety switches may also be provided to shut down the gum-manufacturing machine in the event of failure, say, in the water-cooling system of the panels, or in the event of any other operating defect, as in the case of jamming.

While apparatus has been shown involving the use of two thermoelectric panels in parallel relationship, it is to be understood that a four-panel arrangement may be used in a four-sided configuration defining a channel having a rectangular cross-section through which a conveyor belt may be operated for cooling a rope, sheet, or other extruded product, thereby providing an intense and highly concentrated cooling action which may be regulated within narrow limits.

Various changes and modifications can be made without departing from the essential features of the invention and it is intended in the appended claims to cover all such changes and modifications as fall within the true spirit of the invention.

What is claimed is:

1. Apparatus for conveying and simultaneously cooling a heat-softened product to cause said conveyed product to reach a predetermined degree of plasticity, said apparatus comprising a thermoelectric cooling device having a cooling surface, an adjustable direct-voltage source for energizing said device, means to convey said product along said surface at an adjustable rate, means to sense the plasticity of said product after it leaves said surface to provide a control signal analogous thereto, and means responsive to said signal to adjust said voltage and the rate of conveyance to an extent maintaining said predetermined degree of plasticity.

2. Apparatus for conveying and simultaneously cooling a heat-softened thermoplastic rope to cause said conveyed rope to reach a predetermined degree of plasticity, said apparatus comprising a thermoelectric cooling device having a cooling surface, an adjustable direct-voltage source for energizing said device, belt means sliding along said surface to convey said rope therealong at an adjustable rate, said belt having relatively high thermal conductivity, means to sense the plasticity of said rope after it leaves said surface to provide a control signal representative thereof, and means responsive to said signal to adjust said voltage and the rate of conveyance to an extent maintaining said predetermined degree of plasticity.

3. In apparatus for conveying and simultaneously cooling a heat-softened thermoplastic rope emerging from an extruder, a cooling panel, a moving endless belt surrounding said panel, a horizontal portion of said belt being in sliding contact with said panel, said belt being formed of a material having relatively high thermal conductivity, and means to feed said heated rope from said extruder onto the horizontal portion of said belt whereby said belt constitutes a thermal bridge to remove heat from said rope.

4. In apparatus as set forth in claim 3, wherein said belt is formed of wire mesh.

5. Apparatus for conveying and simultaneously cooling a heat-softened thermoplastic product to cause said product to attain a predetermined degree of pasticity, said apparatus comprising a thermoelectric cooling device having a planar cooling surface, an adjustable direct-voltage source for energizing said device, an endless belt of high thermal conductivity sliding along said surface to convey said product therealong and thereby remove heat from said conveyed product, means to sense the plasticity of said product after it leaves said surface to provide a control signal representative thereof, and means responsive to said signal to adjust said voltage to an extent maintaining said predetermined degree of plasticity.

6. Apparatus as set forth in claim 5, wherein said plasticity sensing means comprises a weighted roller riding on said conveyed product, said roller being pivotally mounted on an arm which is caused to assume an angular position depending on the extent to which the roller sinks into said product, and means to translate said angular position to an analog voltage value, thereby producing said signal.

7. Apparatus for conveying a heated and softened rope and for concurrently cooling the heated rope so that its plasticity facilitates further processing, said apparatus comprising a thermoelectric cooling panel, and endless conveyor belt surrounding said panel, said belt being of high thermal conductivity, a horizontal portion of said belt sliding over the cooled surface of said panel, means feeding said heated rope into the horizontal portion of said belt for conveyance thereby, a direct-voltage source, means including an adjustable rheostat for connecting said source to said panel to energize same, a motor for driving said belt and including speed-adjusting means, a plasticity sensor disposed at the output of said belt for measuring the plasticity of said rope to produce an analog signal, a servo mechanism for adjusting said rheostat and said speed-adjusting means, and means to apply said control signal to said mechanism to effect automatic adjustment in the rate of operation of said conveyor and the cooling power of said panel whereby a predetermined plasticity is maintained.

8. Apparatus for conveying a heated and softened rope of gum from an extruder to a gum-processing system and for cooling the heated rope so that when it enters said system its plasticity facilitates said processing, said apparatus comprising a thermoelectric cooling panel, an endless conveyor belt surrounding said panel, said belt being of high thermal conductivity and a horizontal portion thereof sliding over the cooled surface of said panel, means feeding said heated rope from said extruder onto the horizontal portions of said belt and for conducting the cooled rope leaving said belt into said system, a direct-voltage source, means including an adjustable rheostat for connecting said source to said panel to energize same, a motor for driving said belt and for operating said extruder and including speed-adjusting means, a plasticity sensor disposed between said belt and said system for measuring the plasticity of said rope entering said system to produce an analog signal, a servo mechanism for adjusting said rheostat and said speed-adjusting means, and means to apply said control signal to said mechanism to effect automatic adjusting in the rate of operation of said extruder and conveyor and the cooling power of said panel, whereby a predetermined plasticity is maintained.

9. Apparatus for conveying a heated and softened rope of gum from an extruder to a sizing, slicing and wrapping system and for cooling the heated rope so that when it enters said system its plasticity facilitates further processing, said apparatus comprising a thermoelectric cooling panel having a cold plate, an endless conveyor belt surrounding said panel, said belt being of high thermal conductivity and a horizontal portion thereof sliding over said cold plate, means feeding said heated rope from said extruder onto the horizontal portions of said belt and for conducting the cooled rope leaving said belt into said system, a direct-voltage source, means including an adjustable rheostat for connecting said source to said panel to energize same, a motor for driving said belt and for operating said extruder and including speed-adjusting means, a plasticity sensor disposed between said belt and said system for measuring the plasticity of said rope entering said system to produce an analog signal, a servo mechanism for adjusting said rheostat and said speed-adjusting means, and amplifying means to apply said control signal to said mechanism to effect automatic adjustment in the rate of operation of said extruder and conveyor and the cooling power of said panel, whereby a predetermined plasticity is maintained.

10. Apparatus as set forth in claim 9, further including a second thermoelectric panel disposed over said rope with the cold plate thereof adjacent the upper surface of said rope, and means including a second rheostat to apply a direct voltage to said second panel, said servo mechanism also adjusting said second rheostat.

11. In apparatus as set forth in claim 1, wherein said thermoelectric cooling device is a panel comprising a bank of thermopiles sandwiched between a cold plate and a hot plate, each thermopile being constituted by an array of dissimilar bars having their cold junctions in thermal contact with said cold plate and their hot junctions in thermal contact with said hot plate, said hot plate being hollow and constituting a jacket in which a coolant fluid is circulated.

12. A panel as set forth in claim 11, further including a mica sheet interposed between each of said plates and said thermopile.

13. A panel as set forth in claim 12, wherein said cold plate includes a duct for passing a fluid therethrough for precooling before said fluid is conducted through said jacket.

14. A panel as set forth in claim 11, wherein each thermopile includes an array of five dissimilar bars alternately arranged and interlinked by conductive strips forming said hot and cold junctions.

References Cited by the Examiner

UNITED STATES PATENTS

| | | | |
|---|---|---|---|
| 2,886,618 | 5/59 | Goldsmid | 62—3 |
| 2,965,050 | 12/60 | Doering | 107—12 |
| 2,984,077 | 5/61 | Gaskill | 62—3 |
| 3,064,440 | 11/62 | Waller | 62—3 |

CHARLES A. WILLMUTH, *Primary Examiner.*